UNITED STATES PATENT OFFICE.

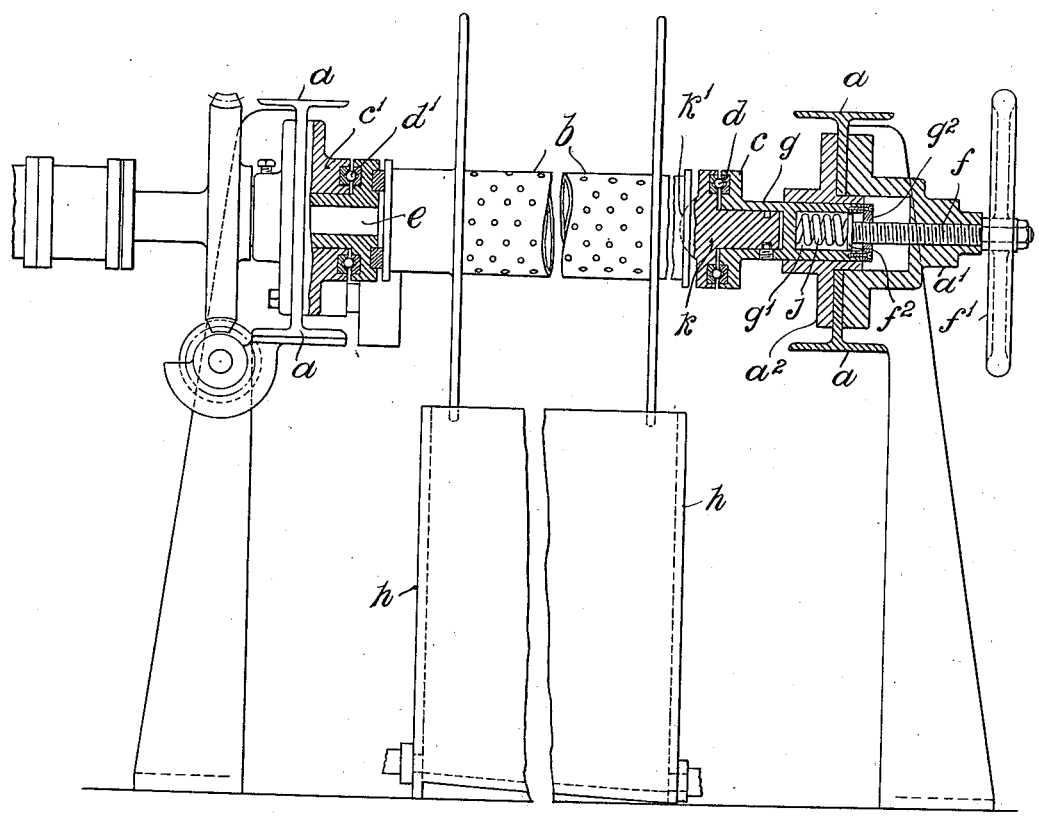

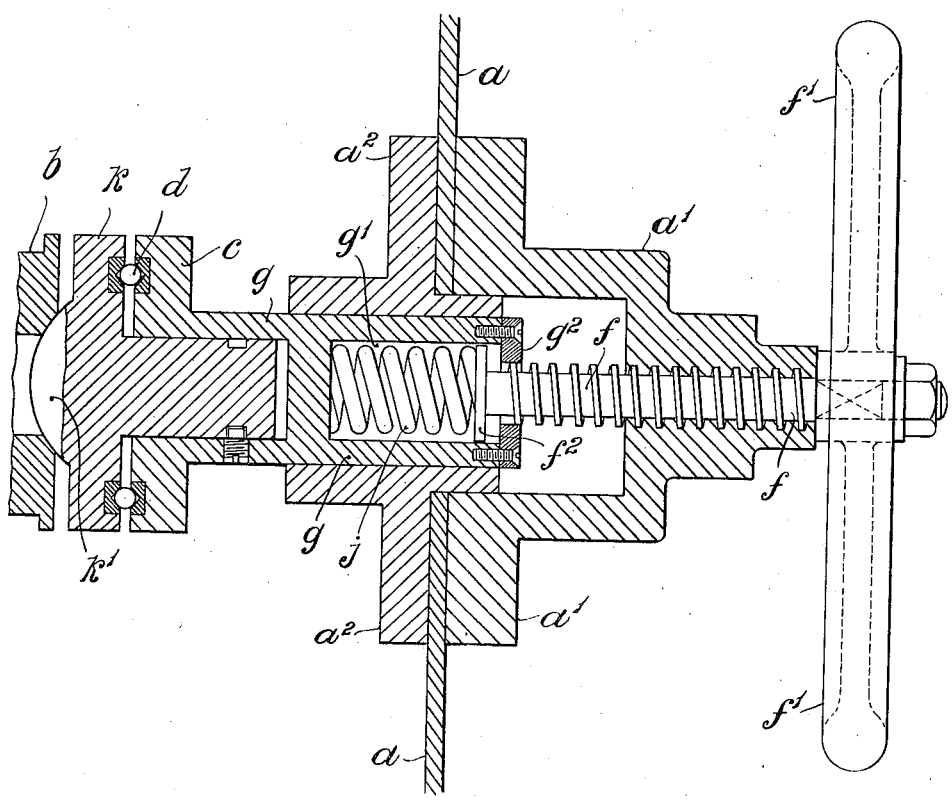

ROBERT SMITH HEAP, OF BURNLEY, ENGLAND.

BEAM-CLAMPING DEVICE.

1,203,733. Specification of Letters Patent. Patented Nov. 7, 1916.

Application filed March 17, 1915. Serial No. 14,987.

*To all whom it may concern:*

Be it known that I, ROBERT SMITH HEAP, a subject of the King of Great Britain and Ireland, residing at Meadow Bank, Ightenhill, Burnley, in the county of Lancaster, England, have invented new and useful Improvements in Beam-Clamping Devices, of which the following is a specification.

This invention relates to rotary perforated beam-machines for treating yarn, wound on the beams, with fluids by passing same through the yarn, in washing, steaming, bleaching, dyeing and drying, and has special reference to machines of the kind wherein the fluid-leading pipes are connected to the beams by arranging intermediate flanges between the ends of the beams and the beamstand frame and forcing the delivery nozzles against these intermediate flanges by a screw.

The object of the present invention is to provide simple and effective means for preventing bending or crushing of the beams if undue pressure is applied by said screw.

According to this invention, instead of adapting the clamping screw to bear directly against the part or member with which it co-acts to effect the locking of the beam, I arrange between the screw and said part or member a spiral or other suitable spring or resilient contrivance which is not wholly compressed when the screw is screwed home.

In the accompanying drawings Figure 1 is an end view, partly in section, of a perforated beam-machine embodying my improvements and Fig. 2 is an enlarged sectional view of the beam-locking means more clearly illustrating my said improvements.

Referring to the drawings, $a$ is the beamstand frame; $b$ is the perforated beam; $c$ is the intermediate flange, with ball bearing $d$, between the frame $a$ and the end of the beam $b$ at the locking side of the machine; $c^1$ is the intermediate flange, with ball bearing $d^1$, between the frame $a$ and the end of the beam at the other side of the machine; $e$ is the nozzle of the fluid-leading pipe; $f$ is the clamping screw, provided with an operating handwheel $f^1$, which works in a nut $a^1$ fixed on the frame $a$ and co-acts with the stem $g$ on the intermediate flange $c$ to force the nozzle $e$ aforesaid at the opposite end of the beam $b$ against the intermediate flange $c^1$ thereat to clamp the beam in position and connect up the fluid-leading pipe thereto; and $h$ is the usual fluid-collecting and reservoir tank.

The stem $g$ of the intermediate flange $c$ is mounted in the usual bracket $a^2$ fixed to the frame $a$, but instead of, as hitherto, adapting the enlarged end $f^2$ of the screw $f$ to bear directly against the stem $g$ to clamp the beam and connect up the fluid-leading pipe, I arrange between the end $f^2$ of the screw $f$ and the stem $g$ a strong spiral spring $j$. The spring $j$ is preferably located in a chamber or recess $g^1$ formed in the stem $g$ and provided with a cover plate $g^2$ through which the screw passes.

The spring $j$ is of suitable tension and its range of compression is such that it is never wholly compressed. By this means the thrust of the screw $f$ is transmitted to the flange $c$ through the spring $j$ and the screwing home of the screw $f$ against the nut $a^1$ after sufficient pressure has been applied to clamp the beam $b$ and connect up the fluid-leading pipe, compresses the spring as shown and does not bend or crush the beam.

The member $k$ between the flange $c$ and the end of the beam $b$ is preferably fashioned with a convex head $k^1$ and the end of the beam with a corresponding seat for the purpose of centering the beam and making a fluid-tight joint therewith without the use of rubber or other packing.

What I claim as my invention and desire to secure by Letters Patent is:—

1. In a perforated beam machine for treating yarn, in combination with rotary disks between the faces of which the beam is clamped, a bearing box for one of said disks adapted to have lateral movement, a screw to effect said lateral movement whereby the beam is clamped in place or released, and a resilient device between said screw and bearing box whereby the thrust is transmitted to the beam without danger of injury to the latter.

2. In a perforated beam machine for treating yarn, in combination with rotary disks between the faces of which the beam is clamped, a bearing box for one of said disks adapted to have lateral movement, a screw to effect said lateral movement whereby the beam is clamped in place or released, and a helical spring between said screw and bearing box whereby the thrust is transmitted to the beam without danger of injury to the latter.

3. In a perforated beam machine for treating yarn, in combination with rotary disks between the faces of which the beam is clamped, a frame, a bearing box for one of said disks carried thereby and adapted to have lateral movement, a ball thrust bearing between said disk and bearing box, a screw to effect lateral movement of said bearing box and the disk carried thereby, and a spring between said screw and box, whereby the thrust is yieldingly transmitted to clamp the beam in place without binding of the bearing or injury to the beam.

In testimony whereof I have signed my name to this specification in the presence of two subscribing witnesses.

ROBERT SMITH HEAP.

Witnesses:
EDMUND WARD PATTISON,
HAROLD WALKER.